UNITED STATES PATENT OFFICE 2,432,071

METHOD OF ACTIVATION OF RED MUD FROM THE BAYER PROCESS

Honoré Jean Thibon, Gardanne, France, assignor to Compagnie de Produits Chimiques et Electrometallurgiques Alais, Froges et Camargue, Paris, France, a corporation of France No Drawing. Application April 10, 1945, Serial No. 587,623. In France June 12, 1943

Section 1, Public Law 690, August 8, 1946
Patent expires June 12, 1963

3 Claims. (Cl. 252—191)

It is a well known fact that the residuary muds formed in the manufacture of alumina through the Deville-Pechiney process absorb $H_2S$ when cold and may be used therefor for the purification of gases. It should be remembered that said Deville-Pechiney process is based on the baking of an intimate mixture of bauxite and sodium carbonate followed by the lixiviation of the fritted masses obtained. But in contradistinction to said process, the red muds formed in the manufacture of alumina in the Bayer process, which consists in attacking the bauxite with a soda lye inside an autoclave, do not possess, by a great deal, the same desulphurizing power. It is generally admitted that this difference is due to the fact that the mud formed in the Deville-Pechiney process contains hydrated iron sesquioxide formed through the hydrolysis of a ferrite produced during the baking, while the red mud of the Bayer process contains only anhydrous iron sesquioxide as already extant in the original bauxite.

Now I have discovered that it is possible to make the Bayer red mud active as concerns gas desulphuration by submitting it to the following treatment:

(1) Baking, at atmospheric pressure and at a temperature which need not rise above 200° C., of a very intimate mixture of red mud with a lye of caustic soda, in proportions such that the amount of $Na_2O$ exceeds by 25 to 30% the mass corresponding to the formulae $Fe_2O_3$, $Na_2O$ and $Al_2O_3$, $Na_2O$. If the baking temperature is raised to 400° C. and above, the excess soda may be substantially reduced. In all cases, the baking should be continued until dryness is reached.

(2) Crushing and lixiviation with hot water of the baked product obtained, said lixiviation being continued until the soda used is practically eliminated.

These operations being ended, it is found that the final red mud has become active as concerns sulphuretted hydrogen at room temperature. The cost of the operation, which at first sight may seem somewhat high is reduced to a not unconsiderable extent if the recovery of an important proportion of the alumina and of the vanadic acid of the red mud is taken into account; such a recovery may be easily performed by introducing the soda lixiviation liquor into the Bayer cycle at a suitable point thereof.

However the red mud, activated as has been disclosed, appears generally in a pulverulent state which lends itself only with difficulty to its use for instance as a thick layer in modern very high small bulk purifying apparatuses. I have found that it is possible to agglomerate it into small solid particles of any desired shape, showing on one hand a great porosity which may be for instance above 70% and on the other hand a cohesion which allows it to resist various handling and to remain uncrushed when piled in towers under thicknesses of several meters. Moreover the regeneration of these purifying masses may be effected in situ without any difficulty, as well as the dissolution of the elementary sulphur by means of a suitable solvent, even when used at temperatures above the melting point of the sulphur; these agglomerated particles retain their solidity and are not disaggregated during these various operations; they may in fact be penetrated throughout by hot solvent or air without being mechanically damaged.

The above disclosed agglomerated particles are obtained through the incorporation of a suitable amount of turf, used as it is taken from the bogs or after partial drying. The homogeneous paste, obtained through kneading of the mixture, is cut out into spheres, cylinders or other suitable shapes in suitable apparatuses such as drawing presses, rotary drums and the like, after which the cut paste is left to dry in the open or kiln-dried. It is also possible to add to the mixture formed of red mud and turf, different substances liable to increase the cohesion and/or porosity of the agglomerated product through a chemical or physical action.

What I claim is:

1. A method for activating the red mud formed in the Bayer alumina-producing process for allowing its use as a gas-desulphurizing substance, comprising baking an intimate mixture of red mud and of a caustic soda lye, at a temperature lower than 600° C., until the mass is perfectly solid and dry and can be easily crushed, crushing the solid product obtained, and lixiviating the same with hot water until all the caustic soda used is substantially dissolved out.

2. A method for activating the red mud formed in the Bayer alumina-producing process for allowing its use as a gas-desulphurizing substance, comprising baking an intimate mixture of red mud and of a caustic soda lye, in proportions such that the amount of $Na_2O$ exceeds by 25 to 30% the amount corresponding to the formulae $Fe_2O_3$, $Na_2O$ and $Al_2O_3$, $Na_2O$, at a temperature not substantially exceeding 200° C., until the mass is perfectly solid and dry and can be easily crushed, crushing the solid product obtained, and lixiviating same with hot water until all the caustic soda used is substantially dissolved out.

3. A method for activating the red mud formed in the Bayer alumina-producing process for allowing its use as a gas-desulphurizing substance, comprising baking an intimate mixture of red mud and of a caustic soda lye, at a temperature comprised between 200 and 600° C. according to the proportions of red mud and caustic soda, until the mass is perfectly solid and dry and can be easily crushed, crushing the solid product obtained, and lixiviating same with hot water until all the caustic soda used is substantially dissolved out.

HONORÉ JEAN THIBON.

REFERENCES CITED

The following references are of record in the file of this patent:

UNITED STATES PATENTS

| Number | Name | Date |
|---|---|---|
| 150,537 | Daddow | May 5, 1874 |
| 248,833 | Lux | Oct. 25, 1881 |
| 1,971,969 | Seil | Aug. 28, 1934 |
| 2,110,240 | Roelen et al. | Mar. 8, 1938 |
| 2,375,343 | Brown | May 8, 1945 |

FOREIGN PATENTS

| Number | Country | Date |
|---|---|---|
| 1,106 | Great Britain | A. D. 1852 |
| 23,967 | Great Britain | A. D. 1906 |